(12) United States Patent
Prakash et al.

(10) Patent No.: US 9,491,672 B2
(45) Date of Patent: Nov. 8, 2016

(54) TIMER ADAPTATION BASED ON CHANGE OF HANDOVER PARAMETER

(71) Applicant: QUALCOMM Incorporated, San Diego, CA (US)

(72) Inventors: Rajat Prakash, San Diego, CA (US); Mehmet Yavuz, San Diego, CA (US); Damanjit Singh, San Diego, CA (US); Andrei Dragos Radulescu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 138 days.

(21) Appl. No.: 14/197,851

(22) Filed: Mar. 5, 2014

(65) Prior Publication Data

US 2015/0257055 A1    Sep. 10, 2015

(51) Int. Cl.
*H04W 36/00* (2009.01)
*H04M 3/00* (2006.01)
*H04W 76/04* (2009.01)

(52) U.S. Cl.
CPC ....... *H04W 36/0083* (2013.01); *H04W 76/046* (2013.01)

(58) Field of Classification Search
CPC .......................... H04W 76/068; H04W 76/046
USPC .......................... 455/436–443, 418–419, 528
See application file for complete search history.

(56) References Cited

U.S. PATENT DOCUMENTS

| 8,472,362 | B2 | 6/2013 | Kenehan et al. | |
| 2005/0287949 | A1* | 12/2005 | Harris | H04W 52/0216 |
| | | | | 455/9 |
| 2006/0160539 | A1* | 7/2006 | Juan | H04W 36/30 |
| | | | | 455/436 |
| 2009/0046573 | A1* | 2/2009 | Damnjanovic | H04W 36/30 |
| | | | | 370/216 |
| 2009/0323638 | A1 | 12/2009 | Catovic et al. | |
| 2010/0120429 | A1* | 5/2010 | Kazmi | H04W 36/30 |
| | | | | 455/436 |
| 2011/0019532 | A1* | 1/2011 | Jung | H04W 76/028 |
| | | | | 370/216 |

(Continued)

FOREIGN PATENT DOCUMENTS

| EP | 2613586 A1 | 7/2013 |
| EP | 2871906 A1 | 5/2015 |

(Continued)

OTHER PUBLICATIONS

Alcatel-Lucent Shanghai Bell., et al., "Handover Optimization associated for solution 5.1.2.3.1 (long connected SDDTE)", 3GPP Draft; R3-131417, 3GPP TSG-RAN WG RAN#381, Barcelona, Spain,Aug. 19-23, 2013, XP050719551, 4 Pages. Retrieved from the Internet: URL:http://www.3gpp.org/ftp/tsgran/WG3Iu/TSGR381/Docs/ [retrieved on Aug. 9, 2013] the whole document.

(Continued)

*Primary Examiner* — Dung Hong
(74) *Attorney, Agent, or Firm* — Muncy, Geissler, Olds & Lowe, P.C.

(57) ABSTRACT

A timer parameter used for transitioning between radio protocol states is adapted based on a change of a handover parameter. For example, as a direct result of a change in a handover parameter such as time-to-trigger, offset, or hysteresis, an inactivity timer that is used for switching an access terminal from a connected state to an idle state may be adapted. As another example, as a direct result of a change in a handover parameter, a radio link failure (RLF) timer that is used for switching an access terminal to an RLF state may be adapted.

30 Claims, 12 Drawing Sheets

(56) References Cited

U.S. PATENT DOCUMENTS

| | | | |
|---|---|---|---|
| 2012/0295622 A1 | 11/2012 | Kazmi et al. | |
| 2013/0130627 A1* | 5/2013 | Fukuta | H04W 24/10 455/67.11 |
| 2013/0130693 A1 | 5/2013 | Salvador et al. | |
| 2015/0087317 A1* | 3/2015 | Yiu | H04W 24/04 455/441 |
| 2015/0092746 A1* | 4/2015 | Jang | H04W 24/08 370/331 |
| 2015/0173013 A1* | 6/2015 | Iwai | H04W 76/046 455/418 |

FOREIGN PATENT DOCUMENTS

| | | |
|---|---|---|
| WO | 0010358 A1 | 2/2000 |
| WO | WO-2012130309 A1 | 10/2012 |
| WO | WO-2012150880 A1 | 11/2012 |
| WO | 2014006815 A1 | 1/2014 |

OTHER PUBLICATIONS

International Search Report and Written Opinion—PCT/US2015/019023—ISA/EPO—May 27, 2015.

* cited by examiner

TIMER ADAPTATION BASED ON CHANGE OF HANDOVER PARAMETER

BACKGROUND

This application relates generally to wireless communication and more specifically, but not exclusively, to adapting a timer as a result of a change of a handover parameter.

A wireless communication network may be deployed to provide various types of services (e.g., voice, data, multimedia services, etc.) to users within a coverage area of the network. In some implementations, macro access points (e.g., corresponding to different macro cells) are distributed throughout a geographical area to provide wireless connectivity for access terminals (e.g., cell phones) that are operating within the area. In addition, core network entities support connectivity between access points, access to other networks (e.g., the Internet), management functions, and other related functions.

In some types of communication networks, several radio protocol states are defined, whereby an access terminal will operate in a given one of these states depending on current operating conditions at the access terminal. Several examples of radio protocol states follow. An access terminal operates in a connected state when connected to an access point. This state facilitates efficient transfer data to or from the access point. An access terminal may operate in an idle state when data transfers to or from an access point are not expected in the immediate future. Of note, the access terminal is configured to consume less power when in the idle state. Also, an access terminal operates in a radio link failure (RLF) state if a communication link has recently failed.

Timers are used in some communication systems to determine whether to switch between radio protocol states. Two examples of such timers follow.

An inactivity timer (also known as a dormancy timer) is used in communication systems, such as 3GPP cellular systems, to transition a user from connected state (also known as active state) to idle state. A dormancy timer may be reset every time an access terminal sends or receives a packet. If a subsequent packet is not sent or received before expiration of the timer, a transition from connected state to idle state is initiated.

An RLF timer is used in communication systems to transition a user to RLF state (e.g., a sub-state of connected state). An RLF timer may be started every time an access terminal experiences poor link conditions. If the poor link conditions continue for the timer period, a transition to RLF state is initiated.

In general, there is a tradeoff between resource usage and power consumption of battery-powered mobile devices. For example, a first access terminal that operates primarily in one state will have fewer signaling events associated with transitions between states as compared to a second access terminal that transitions between states more frequently. Consequently, the first access terminal may use fewer radio resources than the second access terminal. However, if the first access terminal remains in a state such as connected state for longer periods of time, the first access terminal may have higher power consumption than the second access terminal. Accordingly, a need exists for effective techniques for improving the overall performance of network devices.

SUMMARY

A summary of several sample aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to adapting a timer parameter that is used for transitioning between radio protocol states, where the timer parameter is adapted as a direct result of a change in a handover parameter. Through the use of such a technique, the timer parameter can be automatically adapted to account for the handover rate of a user. In some aspects, the handover rate may correlate to the mobility of the user. For example, a decrease in a handover parameter value may result in a higher handover rate. In this case, it may be advantageous to use a shorter inactivity timer value to increase the likelihood that handover (e.g., reselection) of the access terminal will occur during idle state instead of connected state.

The overall performance of the network may thereby be improved since handovers (e.g., reselections) that occur during idle state are generally more efficient (e.g., in terms of power consumption and/or signaling) than handovers that occur during connected state. Moreover, by directly linking a change in a handover parameter to adaptation of a timer, the timer may be quickly adapted in the event there are any changes in network operating conditions that initiate a change in a handover parameter. Consequently, the performance of network devices that use such a timer may more efficiently adapt to changing network operating conditions.

For purposes of illustration, two examples of timer adaptation follow. It should be appreciated that other adaptation techniques may be employed through the use of the teachings herein.

In a first example, an access point elects to change a handover parameter (e.g., time-to-trigger (TTT), offset, or hysteresis). As a direct result of this change, the access point adapts a timer (e.g., an inactivity timer) that is used for switching an access terminal from a connected state to an idle state. Subsequently, the access point determines, based on the adapted timer, that a transition from connected state to idle state is warranted. The access point then sends (e.g., transmits) an indication of this state transition to the access terminal.

Thus, the transitions between states may be adapted depending on how frequently an access terminal is expected to be handed-over. In a case where a change (e.g., decrease) in a handover parameter leads to an increased likelihood of handover, the access terminal will more quickly transition to idle state. This is due to the corresponding shortening of the timer period. Consequently, a higher percentage of handovers will occur during idle state in those situations where a significant number of handovers are expected. Conversely, in a case where a change (e.g., increase) in a handover parameter leads to a decreased likelihood of handover, the access terminal will be less likely to transition to idle state. This is due to the corresponding lengthening of the timer period.

In a second example, a network entity elects to change a handover parameter (e.g., time-to-trigger (TTT), offset, or hysteresis). As a direct result of this change, the network entity adapts a radio link failure (RLF) timer (e.g., 3GPP T310 or N310) that is used for switching an access terminal to an RLF state. The network then sends an indication of the adapted RLF timer to the access terminal (e.g., via a serving access point).

Thus, the RLF timer may be adapted depending on how frequently an access terminal is expected to be handed-over. In a case where a change (e.g., decrease) in a handover parameter leads to an increased likelihood of handover, the access terminal will more quickly abandon the current connection and attempt to establish a different connection. As a result, handover will be completed more quickly in cases where a significant number of handovers are expected. Conversely, in a case where a change (e.g., increase) in a handover parameter leads to a decreased likelihood of handover, the access terminal will be less likely to abandon the current connection.

The teachings herein may be embodied and/or practiced in different ways in different implementations.

In some aspects, an apparatus for communication in accordance with the teachings herein comprises: a processing system configured to: identify a change in at least one handover parameter, adapt a timer parameter for controlling transition between radio protocol states, wherein the adaptation of the timer value is based on the identified change in the at least one handover parameter, and generate an indication based on the adapted timer parameter; and a communication device configured to send the indication from the apparatus to a second apparatus.

In some aspects, a method of communication in accordance with the teachings herein comprises: identifying a change in at least one handover parameter; adapting a timer parameter for controlling transition between radio protocol states, wherein the adaptation of the timer value is based on the identified change in the at least one handover parameter; generating an indication based on the adapted timer parameter; and sending the indication from a first apparatus to a second apparatus.

In some aspects, an apparatus for communication in accordance with the teachings herein comprises: means for identifying a change in at least one handover parameter; means for adapting a timer parameter for controlling transition between radio protocol states, wherein the adaptation of the timer value is based on the identified change in the at least one handover parameter; means for generating an indication based on the adapted timer parameter; and means for sending the indication from the apparatus to a second apparatus.

In some aspects, a computer-program product in accordance with the teachings herein comprises computer-readable medium comprising code for causing a computer to: identify a change in at least one handover parameter; adapt a timer parameter for controlling transition between radio protocol states, wherein the adaptation of the timer value is based on the identified change in the at least one handover parameter; generate an indication based on the adapted timer parameter; and send the indication from a first apparatus to a second apparatus.

BRIEF DESCRIPTION OF THE DRAWINGS

These and other sample aspects of the disclosure will be described in the detailed description and the claims that follow, and in the accompanying drawings, wherein:

Figure 1:
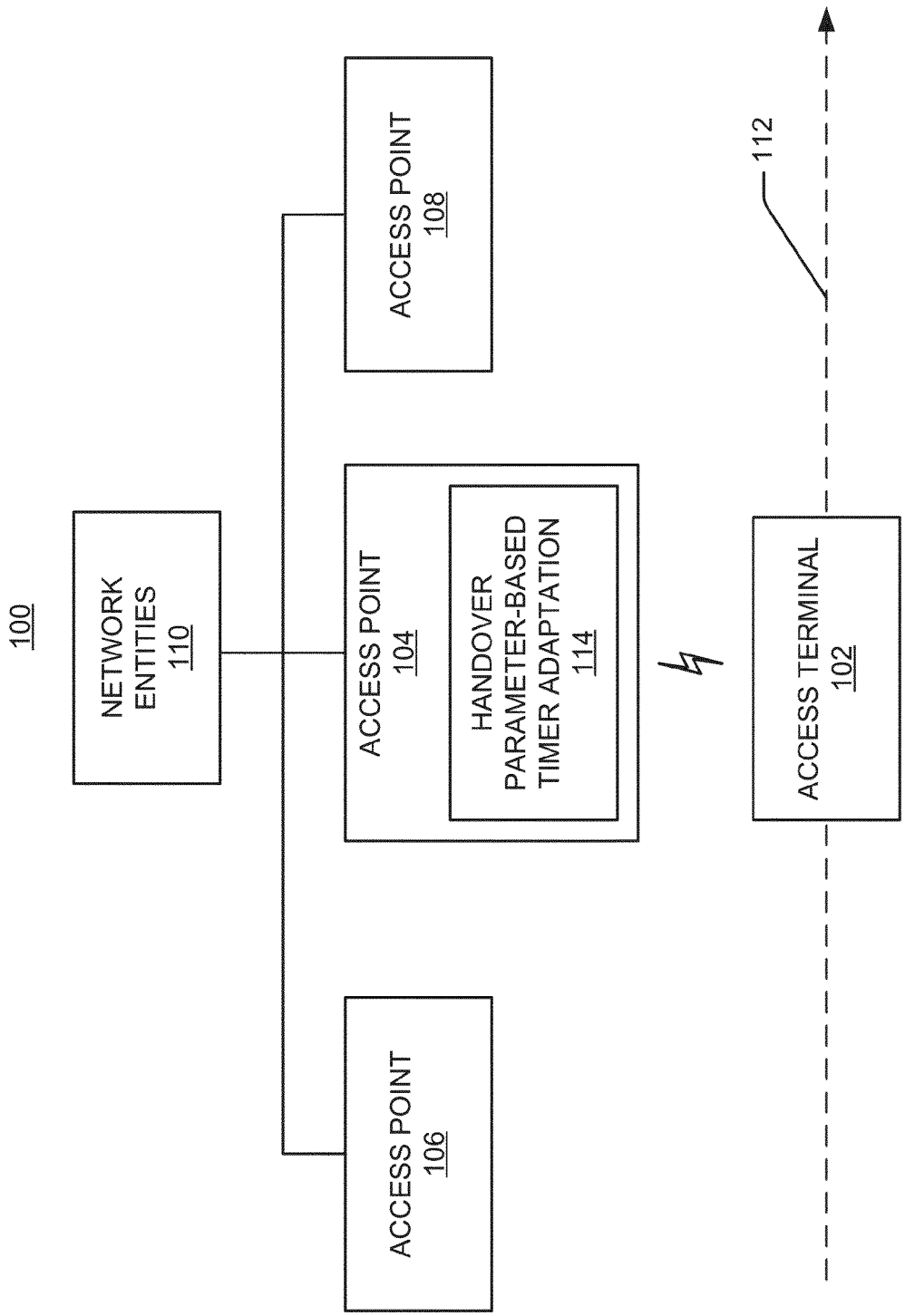
FIG. 1 is a simplified block diagram of several sample aspects of a communication system adapted to support timer adaptation.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The disclosure relates in some aspects to adapting a timer parameter that is used for transitioning between radio protocol states. The timer parameter may comprise, for example, an inactivity timer that is used to transition between connected state and idle state, an RLF timer that is used to transition to RLF state, or some other type of timer.

In accordance with some aspects of the disclosure, the timer parameter is adapted as a direct result of a change in a handover parameter. For example, a decrease in a handover parameter such as time-to-trigger, offset, or hysteresis for an access terminal may cause the access terminal to be handed-over more frequently. Upon identifying this decrease in the handover parameter, a timer value for an inactivity timer of the access terminal may be decreased. Consequently, the access terminal will be more likely to conduct its handovers during idle mode rather than connected mode, thereby improving system performance. As another example, upon identifying a decrease in a handover parameter for an access terminal, a timer value for an RLF timer of the access terminal may be decreased. Consequently, in scenarios where an access terminal is expected to be handed-over more frequently due to the change in the handover parameter, the access terminal may enter RLF state sooner and thereby initiate handover to another access point more quickly.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points in the system 100 provide access to one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, an access point 108, or some other access point in the system 100 (not shown).

Each of the access points may communicate with one or more network entities (represented, for convenience, by the network entities 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

At a given point in time, the access terminal 102 may be served by a given one of the access points of the system 100. As represented by the dashed line 112, as the access terminal moves throughout the coverage area of the system 100, the access terminal 102 may move away from its serving access point and move closer to another access point. In addition, signal conditions within a given cell may change, whereby the access terminal 102 may be better served by another access point. In either of these cases, to maintain mobility for the access terminal 102, the access terminal 102 may be handed-over from its serving access point to the other access point.

Under certain conditions, an access terminal may be subjected to a relatively high rate of handover. For example, a high handover rate may occur when an access terminal is traveling through a network with a dense concentration of low power access points (e.g., small cells). As another example, a high handover rate may occur when an access terminal is traveling at a relatively high rate of speed. These situations may be referred to as a case where an access terminal (or a user of the access terminal) is highly mobile.

It is desirable for highly mobile access terminals to spend as much time as possible in idle state (as opposed to connected state). This is because highly mobile access terminals are generally subjected to a relatively large number of handovers, and idle state handovers are generally less expensive in terms of consumption of network resources than connected state handovers.

Conversely, it is desirable for less mobile access terminals to remain in connected state. In this case, a less mobile access terminal will not be consuming significant network resources associated with handover. Moreover, by remaining in connected state, the access terminal may be more responsive to traffic and signaling.

Also, under high mobility conditions, an access terminal may be subjected to relatively frequent RLF. For example, as an access terminal traveling at a high rate of speed moves away from its serving access point and enters coverage of a neighbor access point, signal conditions on the link to the serving access point may quickly deteriorate. In such a case, the link may fail before the access terminal is successfully handed-over to the neighbor access point.

Consequently, it is desirable for highly mobile access terminals to move to RLF state relatively quickly. In this way, once a link has become degraded, the access terminal will wait less time before abandoning the connection and attempting to establish a different connection.

The disclosure relates in some aspects to techniques that enable an access terminal to more quickly transition between radio protocol states. To achieve quicker state transitions, a timer that is used to make these transitions is adapted based on a change in one or more handover parameters.

In accordance with the teachings here, a change in a handover parameter may be indicative of access terminal mobility (e.g., how frequently the access terminal is being or will be handed-over). For example, it can be predicted that handovers will occur more frequently when a handover parameter such as TTT, offset, or hysteresis is set to a lower value. Conversely, it can be predicted that handovers will occur less frequently when a handover parameter such as TTT, offset, or hysteresis is set to a higher value.

Thus, by using knowledge of the trend that changes in a handover parameter can have on handover rate, intelligent adaptation of a radio protocol state timer may be made. For example, by adapting a radio protocol state transition timer in direct response to a change in a handover parameter, the manner in which an access terminal transitions between radio protocol states may be better correlated with the how frequently the access terminal is expected to be handed-over.

For example, the timer period of an inactivity timer may be shortened for a high mobility access terminal (e.g., as indicated by a handover parameter such as TTT being set to a lower value). In this case, the access terminal will transition to idle state more quickly due to the shorter timer period. Conversely, the timer period of an inactivity timer may be lengthened for a low mobility access terminal (e.g., as indicated by a handover parameter such as TTT being set to a higher value). In this case, due to the longer timer period, the access terminal will be more likely to remain in connected state.

As another example, the timer period of an RLF timer may be shortened for a high mobility access terminal. In this case, the access terminal will transition to RLF state more quickly due to the shorter timer period. Conversely, the timer period of an RLF timer may be lengthened for a low mobility access terminal. In this case, due to the longer timer period, the access terminal will be less likely to transition to an RLF state.

Of note, the adaptation of the timer may occur as a direct result of identifying a change in a handover parameter. Thus, the manner of operation of protocol state transitions may be adapted immediately after (e.g., in a matter of milliseconds or less) the handover parameter is changed.

In the example of FIG. 1, the access point 104 is depicted as employing a component for handover parameter-based timer adaptation 114. Such a component may, for example, track any changes in one or more handover parameters and, in the event a change is detected, adapt a timer that is used for transitioning between radio protocol states. In different implementations, some or all of the functionality of the component for handover parameter-based timer adaptation 114 may be embodied in different entities. For example, in some implementations, a network entity may adapt such a timer based on a change in a handover parameter. In addition, in some implementations, an access terminal may adapt such a timer based on a change in a handover parameter.

Sample operations relating to timer adaptation will now be described in more detail in conjunction with the flowchart of FIG. 2. For convenience, the operations of FIG. 2 (or any other operations discussed or taught herein) may be described as being performed by specific components (e.g., components of FIG. 1, FIG. 3, FIG. 4, FIG. 7, FIG. 11, or FIG. 12). It should be appreciated, however, that these operations may be performed by other types of components and may be performed using a different number of components. It also should be appreciated that one or more of the operations described herein may not be employed in a given implementation.

Figure 2:
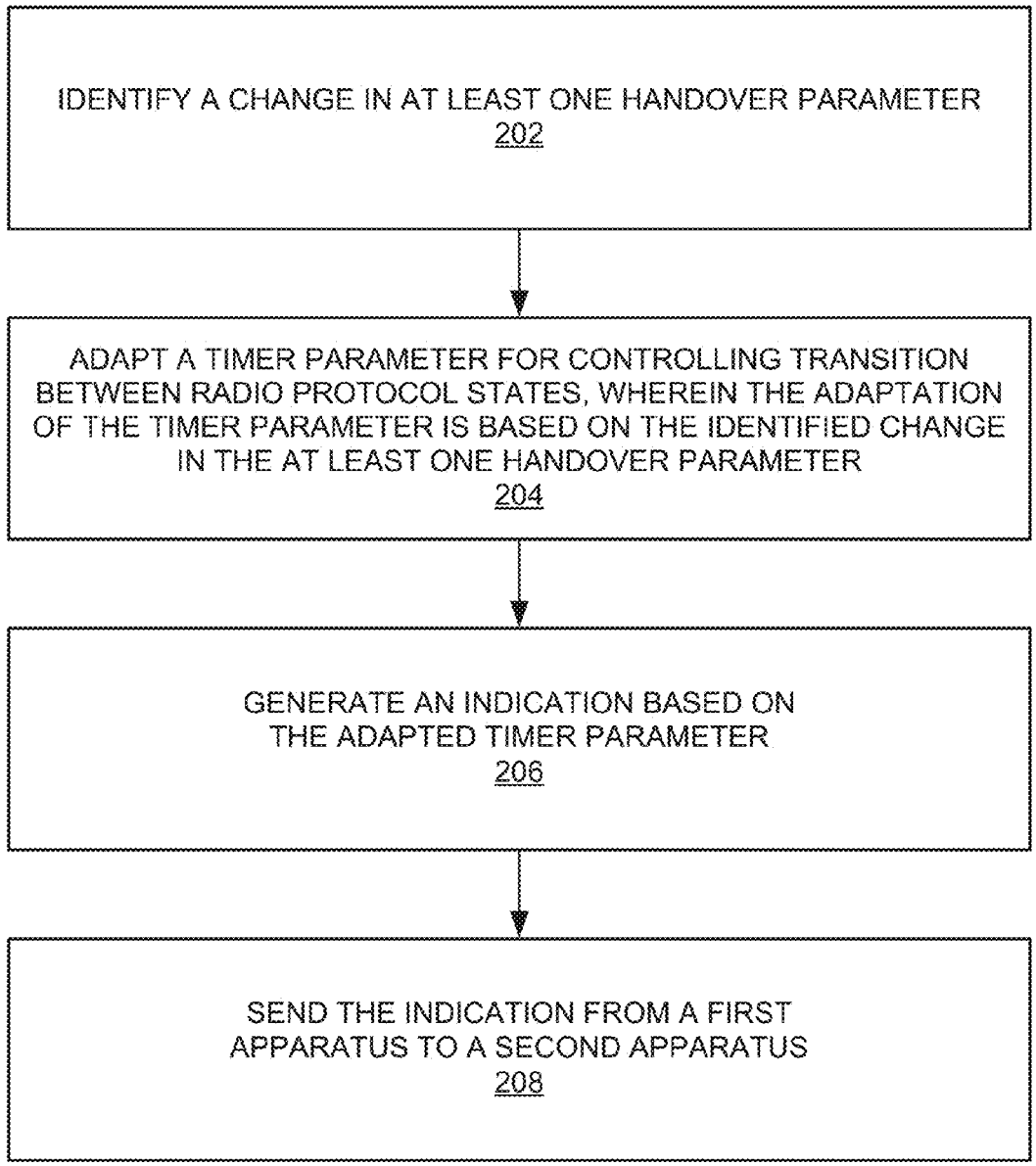
FIG. 2 is a flowchart of several sample aspects of operations that may be performed in conjunction with timer adaptation.

As represented by block 202 of FIG. 2, a change in at least one handover parameter is identified. For example, an entity may change a handover parameter or may receive an indication of a change in a handover parameter. Thus, in some aspects, the identification of the change in the at least one handover parameter may comprise determining that the change is to be made. In addition, in some aspects, the identification of the change in the at least one handover parameter may comprise determining that the change has been made. Also, in some aspects, the identification of the change in the at least one handover parameter may comprise receiving a signal indicative of the change.

The change identified at block 202 may be in absolute terms or relative terms. In some implementations, the identifying entity identifies the new value to be used or being used for each handover parameter. In some implementations, the identifying entity identifies how much of a change has been made or will be made to the value for each handover parameter. In either case, the identifying entity may keep track of the previous value (or values) of the handover parameter. This information may be used, for example, to identify any trends relating to changes in the handover parameter over time.

A handover parameter may take different forms in different implementations. For example, the at least one handover parameter may comprise: a time-to-trigger parameter, an offset parameter, a hysteresis parameter, some other handover-related parameter, or a combination of two or more of these parameters.

As represented by block 204, a timer parameter for controlling transition between radio protocol states is adapted. The adaptation of the timer value is based on the identified change in the at least one handover parameter at block 202. That is, the timer parameter is adapted as a direct result of identifying a change in a handover parameter (or multiple handover parameters).

A timer parameter may take various forms. Typically, the timer parameter comprises a value that is used in conjunction with a timer (count up or count down) to determine whether a particular period of time has elapsed. In some implementations, the timer comprises an inactivity (e.g., dormancy) timer. Thus, the timer parameter may comprise an inactivity timer value. In some implementations, the timer comprises an RLF timer. Thus, the timer parameter may comprise an RLF timer value.

The transition between radio protocol states also may take various forms. In some implementations, the transition between radio protocol states involves a transition between connected state and idle state. In some implementations, the transition between radio protocol states involves a transition to an RLF state within a connected state. Thus, in the latter case, the radio protocol states may comprise connected state and RLF state.

As represented by block 206, an indication based on the adapted timer parameter is generated. The manner in which this indication is generated and the type of indication generated may take different forms in different implementations.

In some implementations, the indication explicitly indicates that the timer parameter has been adapted. For example, the indication may comprise a value of the adapted parameter (e.g., the new value of the parameter, a delta indicative of the change in the timer parameter value, etc.). As a specific example, the indication may indicate an RLF timer value (e.g., a value to be used for T310 or N310).

In some implementations, the indication generated is based on the adapted timer parameter but is not explicitly indicative of that adaptation. For example, the adapted timer parameter may be used to control state transitions. Thus, at some point in time, a state transition will occur based on the adapted timer parameter. In such a case, the generation of the indication at block 206 may involve generating an indication of this state transition. Here, inherently, the indication of the state transition is based on the adapted timer parameter. Accordingly, in some aspects, the generation of the indication may comprise transitioning from a first one of the radio protocol states to a second one of the radio protocol states based on the adapted timer parameter, and generating a message or some other indication that is indicative of the transition.

As represented by block 208, the indication generated at block 206 is sent from a first apparatus to a second apparatus. For example, in an implementation where the operations of FIG. 2 are performed by an access point, the operations of block 208 may involve the access point sending (e.g., transmitting) the indication to a served access terminal. As another example, in an implementation where the operations of FIG. 2 are performed by a network entity, the operations of block 208 may involve the network entity sending the indication to an access terminal (e.g., via an access point).

The parameters discussed herein may be associated with one or more access terminals. In some cases, a single parameter is used for multiple access terminals. In other cases, each access terminal may be assigned its own dedicated parameter. Combinations of shared and dedicated parameters also may be employed in some implementations.

The radio protocol states also may be associated with one or more access terminals. In some cases, a single set of radio protocol states is used to control the state of multiple access terminals. In other cases, each access terminal may be assigned its own dedicated set of radio protocol states. Combinations of shared and dedicated set of radio protocol states also may be employed in some implementations.

Figure 3:
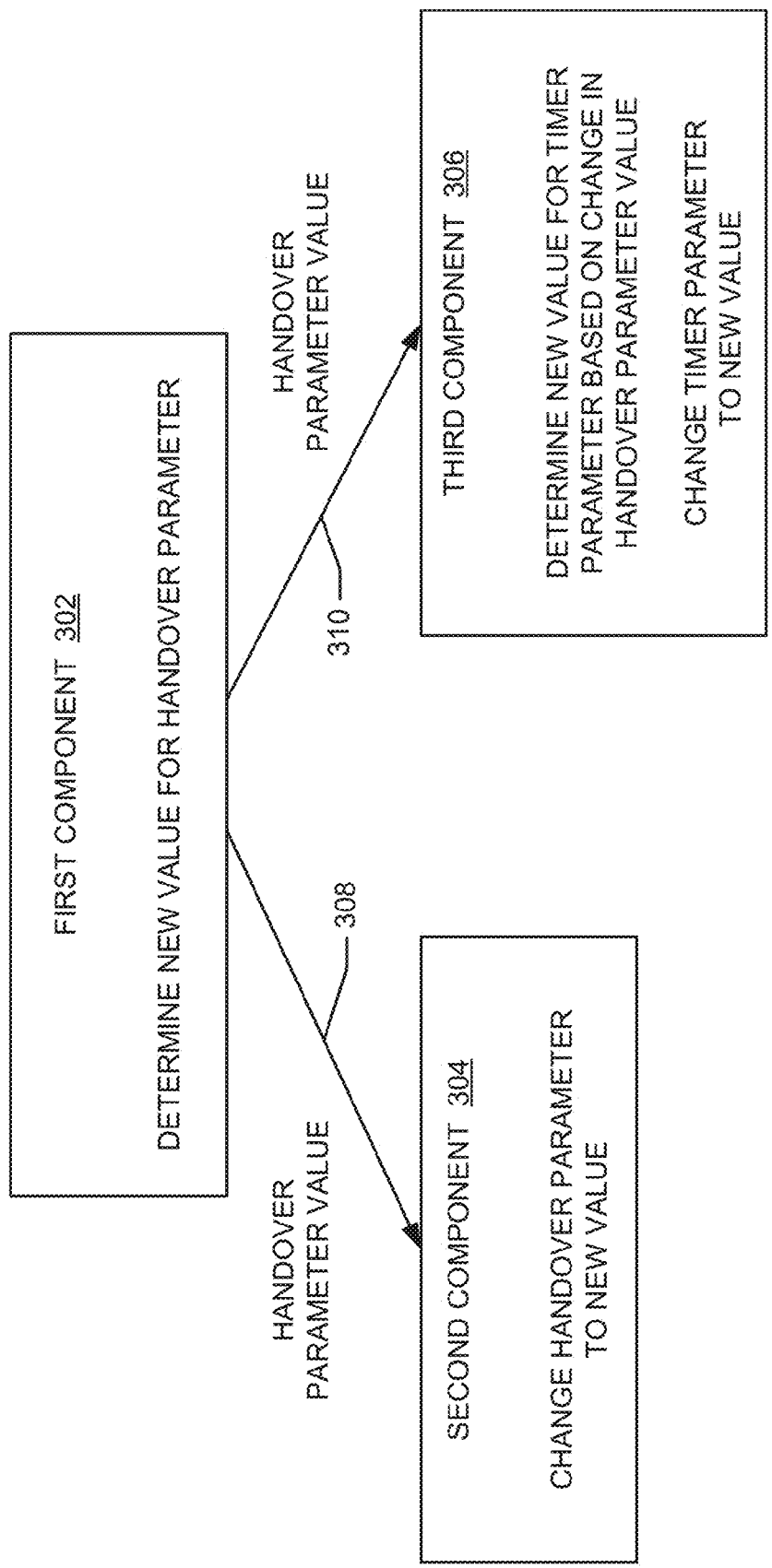
FIG. 3 is a simplified diagram illustrating an example of components that perform timer adaptation-related operations.
Figure 4:
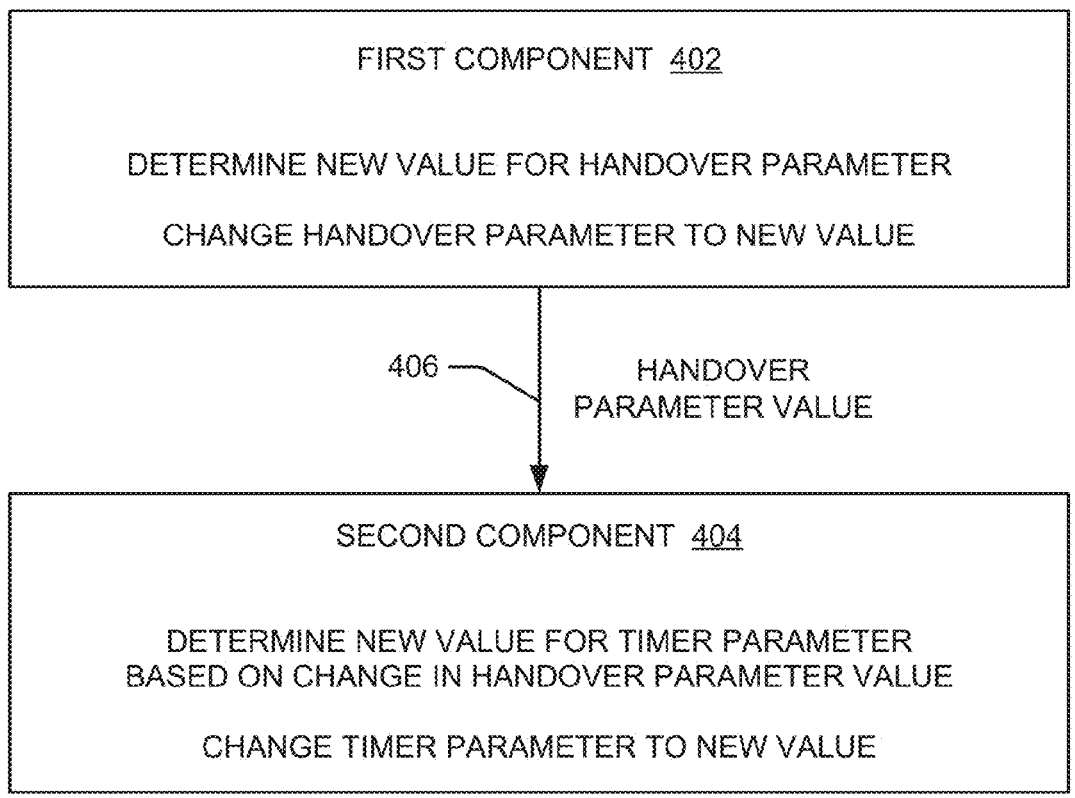
FIG. 4 is a simplified diagram illustrating another example of components that perform timer adaptation-related operations.

FIGS. 3 and 4 illustrate examples of components that may be used to change parameters and perform other operations as described herein. It should be appreciated based on the teachings herein that different configurations of one or more components may be used to perform these operations in different implementations.

FIG. 3 illustrates an implementation comprising a first component 302, a second component 304, and a third component 306. These components may represent, for example, different software modules executed by a processing system, different components of a processing system (e.g., an application-specific integrated circuit (ASIC), a system-on-a-chip (SoC), etc.), or components of some other type of processing entity or entities. The components of FIG. 3 may be embodied in an access point, a network entity, or some other suitable entity or entities.

As indicated in FIG. 3, the first component 302 determines a new value for a handover parameter. For example, the first component 302 may monitor handover events and/or channel conditions to determine whether to change a handover parameter. Subsequently, the first component 302 sends an indication of the change in the handover parameter to the second component 304 as represented by the line 308 and to the third component 306 as represented by the line 310. For example, the first component 302 may send the actual handover parameter value or an indication of the magnitude and direction (up or down) of the change in this value.

Upon receipt of the handover parameter value, the second component 304 changes the corresponding handover parameter to the new value. For example, the second component 304 may configure a handover parameter variable (e.g., stored in a memory location, a register, etc.) that is used during handover-related operations to determine whether to handover an access terminal.

Upon receipt of the handover parameter value at the third component 306, the third component 306 determines a new value for a timer parameter. For example, the third component 306 may configure a timer (e.g., by writing to a memory location, a register, etc.) that is used to determine whether to transition between radio protocol states. In accordance with the teachings herein, the determination of the new timer parameter value is triggered by the change in the handover parameter value.

In some implementations, the first component 302 actively controls operations of the second component 304 and the third component 306. For example, the first component 302 may decide whether and how to change a handover parameter. The first component 302 may then instruct the second component 304 to change the handover parameter and instruct the third component 306 to change the timer parameter. Such an instruction can take different forms in different implementations including passing a parameter, sending a message, setting a variable, programming a register, and so on. Thus, in some aspects, generating such an instruction may involve generating an indication. Also, in some aspects, generating such an instruction may involve generating a signal.

FIG. 4 illustrates an example of an implementation comprising a first component 402 and a second component 404. These components may represent, for example, different software modules executed by a processing system, different components of a processing system, or some other suitable type of components. The components of FIG. 4 may be embodied in an access point, a network entity, or some other suitable entity or entities.

As indicated in FIG. 4, the first component 402 determines a new value for a handover parameter. For example, the first component 402 may monitor handover events and/or channel conditions to determine whether to change a handover parameter.

The first component 402 then changes the handover parameter to the new value. For example, the first component 402 may configure a handover parameter variable that is used during handover-related operations to determine whether to handover an access terminal.

The first component 402 also sends an indication of the change in the handover parameter to the second component 404 as represented by the line 406. For example, the first component 402 may send the actual handover parameter value or an indication of the magnitude and direction of the change in this value.

Upon receipt of the handover parameter value, the second component 404 determines a new value for a timer parameter. In accordance with the teachings herein, the determination of the new timer parameter value is triggered by the change in the handover parameter value.

Subsequently, the second component 404 changes the timer parameter to the new value. For example, the second component 404 may configure a timer that is used to determine whether to transition between radio protocol states.

In some implementations, the first component 402 actively controls operations of the second component 404. For example, the first component 402 may decide whether and how to change a handover parameter and then instruct the second component 404 to change the timer parameter. Such an instruction can take different forms in different implementations including passing a parameter, sending a message, setting a variable, programming a register, and so on. In some aspects, generating such an instruction may involve generating an indication. Also, in some aspects, generating such an instruction may involve generating a signal.

Figure 5:
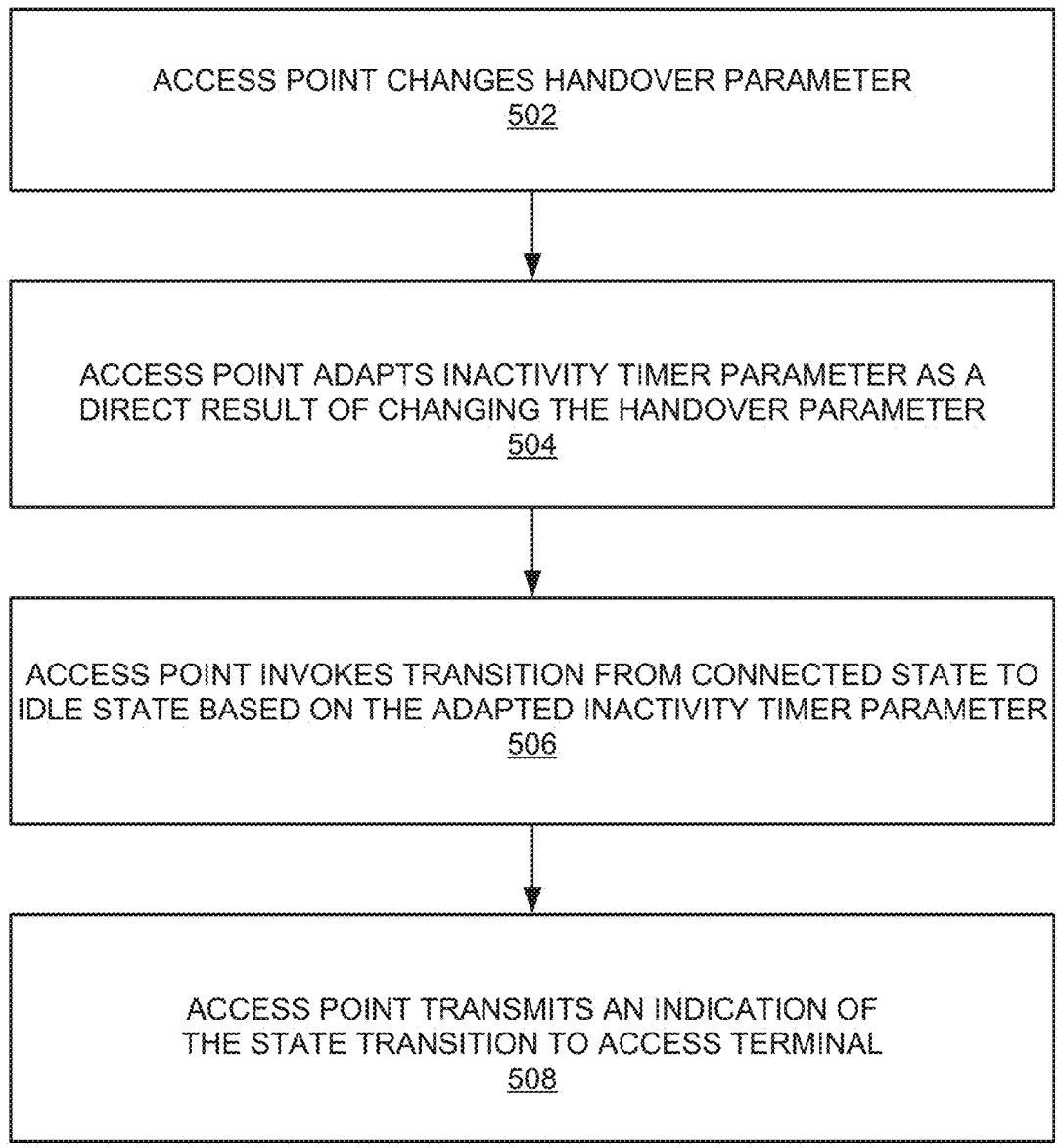
FIG. 5 is flowchart of several sample aspects of operations that may be performed in conjunction with adapting an inactivity timer.
Figure 6:
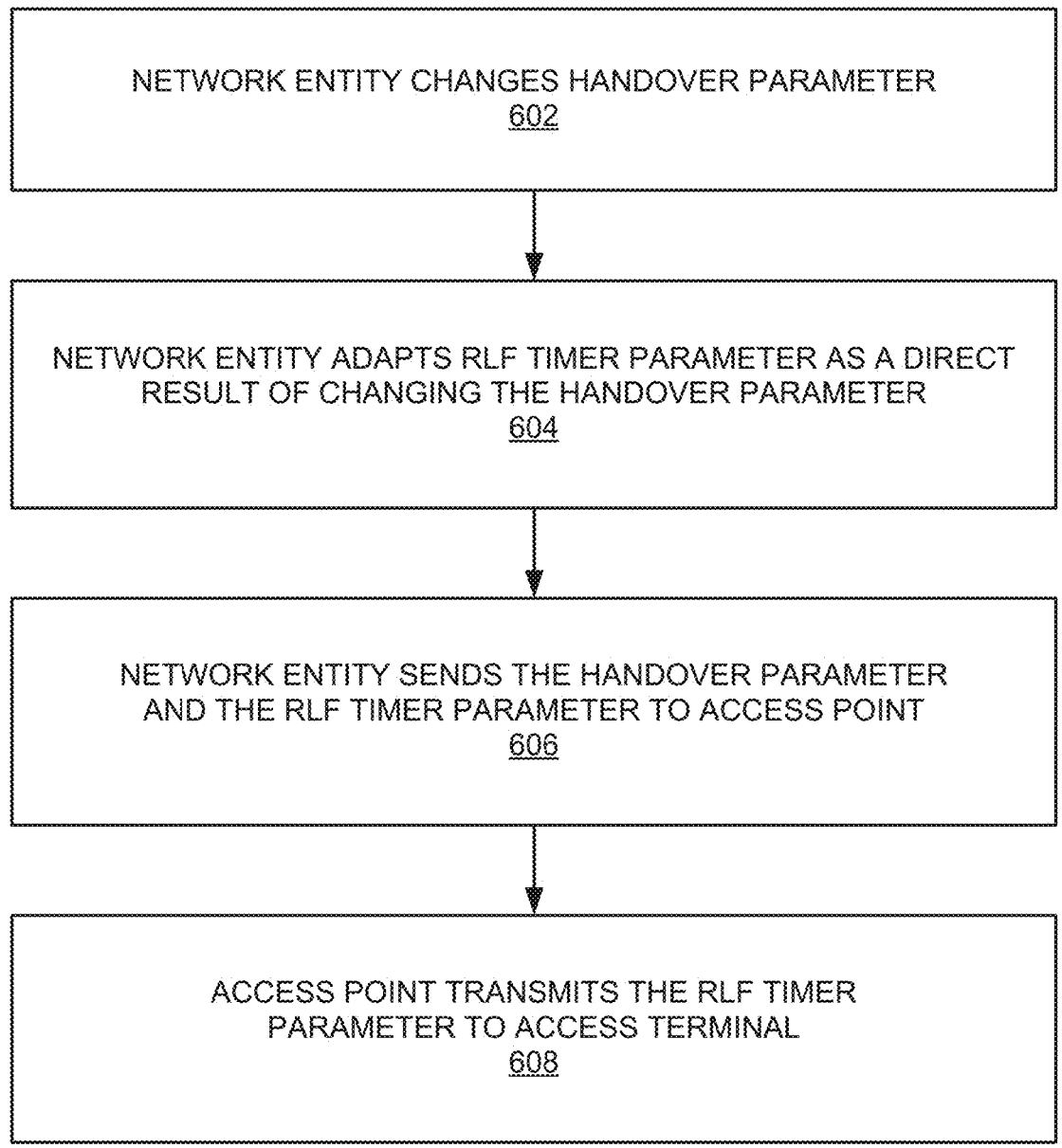
FIG. 6 is flowchart of several sample aspects of operations that may be performed in conjunction with adapting an RLF timer.

As mentioned above, the teachings herein may be implemented by different entities in different implementations. FIGS. 5 and 6 illustrate two examples of operations that may be performed by different entities. It should be appreciated that the operations of FIGS. 5 and 6 may be implemented by entities other than those specifically described.

FIG. 5 illustrates an example of operations that may be performed by an access point to adapt an inactivity timer.

As represented by block 502, at some point in time, the access point changes a handover parameter. For example, the access point may monitor handover statistics and/or channel conditions for an access terminal currently being served by the access point, or the access point may receive this information from another entity (e.g., a network entity).

The access point may then determine that a change in a handover parameter is warranted based on this information. Alternatively, the access point may receive a request from another entity (e.g., a network entity) to change a handover parameter.

As represented by block 504, as a direct result of changing the handover parameter at block 502, the access point adapts an inactivity timer parameter. For example, a given inactivity timer may be used to control radio protocol state transitions for a given access terminal. Thus, the access point will configure this inactivity timer to use the adapted inactivity timer parameter.

As mentioned above, the manner in which the access point adapts the inactivity timer parameter may be based on the manner of the change in the handover parameter. For example, an increase in TTT, offset, or hysteresis may result in an increase in the value of the inactivity timer parameter.

As represented by block 506, at some later point in time, the access point invokes a transition from connected state to idle state based on the adapted inactivity timer parameter. Continuing with the example of block 504, the access point may reset the inactivity timer each time the access point determines that there is packet traffic to or from the access terminal. If the access point subsequently determines that there is no additional packet traffic to or from the access terminal prior to the expiration of the activity timer, the access point will invoke the transition from connected state to idle state for that access terminal.

As represented by block 508, the access point then transmits an indication of the state transition to the corresponding access terminal. As a result, the access terminal will switch to idle state.

From the above, it should be appreciated that changes in a handover parameter may directly cause a change in the manner in which an access terminal transitions between states. For example, an access terminal will transition to idle state more quickly (due to a short timer period) when a handover parameter such as TTT is set to a lower value, as opposed to when such a handover parameter is set to a higher value.

FIG. 6 illustrates an example of operations that may be performed by a network entity (e.g., an operations and management (O&M) server) to adapt an RLF timer.

As represented by block 602, at some point in time, the network entity changes a handover parameter. For example, the network entity may monitor handover statistics and/or channel conditions for an access terminal operating within the coverage of a network managed by the network entity. The network entity may then determine that a change in a handover parameter is warranted based on this information. Alternatively, the network entity may receive a request from another entity (e.g., another network entity) to change a handover parameter.

As represented by block 604, as a direct result of changing the handover parameter at block 602, the network entity adapts an RLF timer parameter. For example, a given RLF timer may be used to control RLF state transitions for a given access terminal. Thus, the network entity may configure this RLF timer to use the adapted RLF timer parameter.

As mentioned above, the manner in which the network entity adapts the RLF timer parameter may be based on the manner of the change in the handover parameter. For example, an increase in TTT, offset, or hysteresis may result in an increase in the value of the RLF timer parameter.

As represented by block 606, the network entity sends the handover parameter from block 602 and the RLF timer parameter from block 604 to an access point that is serving the access terminal.

As represented by block 608, the access point then transmits the received handover parameter and RLF timer parameter to the access terminal. Thus, the access terminal is configured to use the new parameters.

From the above, it should be appreciated that changes in a handover parameter may directly cause a change in the manner in which an access terminal transitions to RLF. For example, an access terminal will transition to RLF more quickly (due to a short timer period) when a handover parameter such as TTT is set to a lower value, as opposed to when such a handover parameter is set to a higher value.

Figure 7:
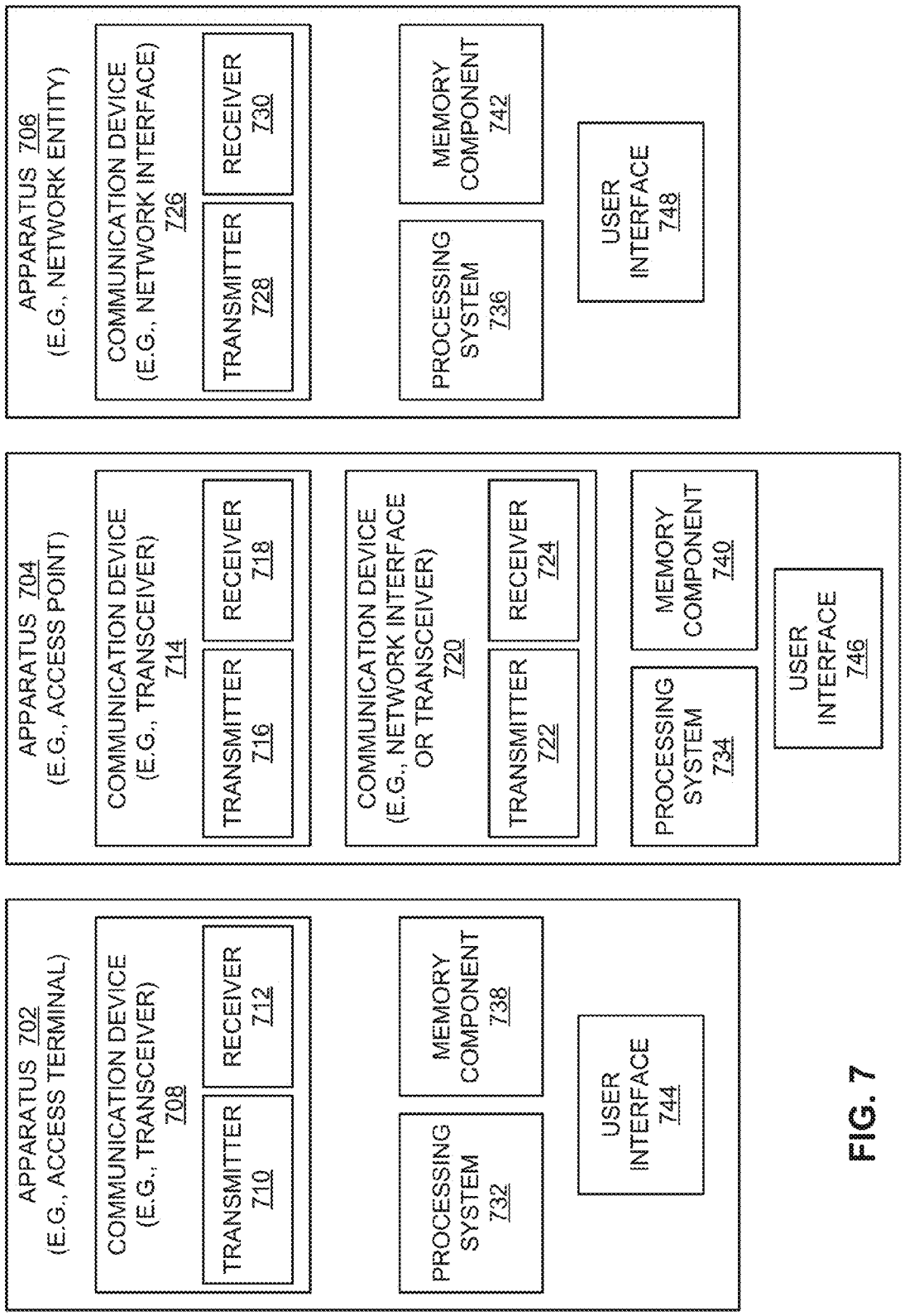
FIG. 7 is a simplified block diagram of several sample aspects of components that may be employed in communication nodes.

FIG. 7 illustrates several sample components (represented by corresponding blocks) that may be incorporated into an apparatus 702, an apparatus 704, and an apparatus 706 (e.g., corresponding to an access terminal, an access point, and a network entity, respectively) to perform timer adaptation operations as taught herein. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 702 and the apparatus 704 each include at least one wireless communication device (represented by the communication devices 708 and 714 (and the communication device 720 if the apparatus 704 is a relay)) for communicating with other nodes via at least one designated radio access technology. Each communication device 708 includes at least one transmitter (represented by the transmitter 710) for transmitting and encoding signals (e.g., messages, indications, information, and so on) and at least one receiver (represented by the receiver 712) for receiving and decoding signals (e.g., messages, indications, information, pilots, and so on). Similarly, each communication device 714 includes at least one transmitter (represented by the transmitter 716) for transmitting signals (e.g., messages, indications, information, pilots, and so on) and at least one receiver (represented by the receiver 718) for receiving signals (e.g., messages, indications, information, and so on). If the apparatus 704 is a relay access point, each communication device 720 may include at least one transmitter (represented by the transmitter 722) for transmitting signals (e.g., messages, indications, information, pilots, and so on) and at least one receiver (represented by the receiver 724) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 704 comprises a network listen module.

The apparatus 706 (and the apparatus 704 if it is not a relay access point) includes at least one communication device (represented by the communication device 726 and, optionally, 720) for communicating with other nodes. For example, the communication device 726 may comprise a network interface that is configured to communicate with one or more network entities via a wire-based or wireless backhaul. In some aspects, the communication device 726 may be implemented as a transceiver configured to support wire-based or wireless signal communication. This communication may involve, for example, sending and receiving: messages, parameters, or other types of information. Accordingly, in the example of FIG. 7, the communication device 726 is shown as comprising a transmitter 728 and a receiver 730. Similarly, if the apparatus 704 is not a relay access point, the communication device 720 may comprise a network interface that is configured to communicate with one or more network entities via a wire-based or wireless backhaul. As with the communication device 726, the communication device 720 is shown as comprising a transmitter 722 and a receiver 724.

The apparatuses 702, 704, and 706 also include other components that may be used in conjunction with timer adaptation operations as taught herein. The apparatus 702 includes a processing system 732 for providing functionality relating to, for example, timer adaptation as taught herein and for providing other processing functionality. The apparatus 704 includes a processing system 734 for providing functionality relating to, for example, timer adaptation as taught herein and for providing other processing functionality. The apparatus 706 includes a processing system 736 for providing functionality relating to, for example, timer adaptation as taught herein and for providing other processing functionality. The apparatuses 702, 704, and 706 include memory devices 738, 740, and 742 (e.g., each including a memory device), respectively, for maintaining information (e.g., information indicative of reserved resources, thresholds, parameters, and so on). In addition, the apparatuses 702, 704, and 706 include user interface devices 744, 746, and 748, respectively, for providing indications (e.g., audible and/or visual indications) to a user and/or for receiving user input (e.g., upon user actuation of a sensing device such a keypad, a touch screen, a microphone, and so on).

For convenience, the apparatus 702 is shown in FIG. 7 as including components that may be used in the various examples described herein. In practice, the illustrated blocks may have different functionality in different aspects. For example, functionality of the block 734 for supporting the implementation of FIG. 3 may be different as compared to functionality of the block 734 for supporting the implementation of FIG. 4.

The components of FIG. 7 may be implemented in various ways. In some implementations, the components of FIG. 7 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 708, 732, 738, and 744 may be implemented by processor and memory component(s) of the apparatus 702 (e.g., by execution of appropriate code and/or by appropriate configuration of processor components). Similarly, some or all of the functionality represented by blocks 714, 720, 734, 740, and 746 may be implemented by processor and memory component(s) of the apparatus 704 (e.g., by execution of appropriate code and/or by appropriate configuration of processor components). Also, some or all of the functionality represented by blocks 726, 736, 742, and 748 may be implemented by processor and memory component(s) of the apparatus 706 (e.g., by execution of appropriate code and/or by appropriate configuration of processor components).

Some of the access points referred to herein may comprise low-power access points. In a typical network, low-power access points (e.g., small cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as small cells may have a maximum transmit power of 20 dBm or less. In some implementations, low-power access points such as small cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells.

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point or small cell access point (e.g., a femto access point, or a pico access point, etc.) may be referred to as a macro cell or small cell, respectively.

Figure 8:
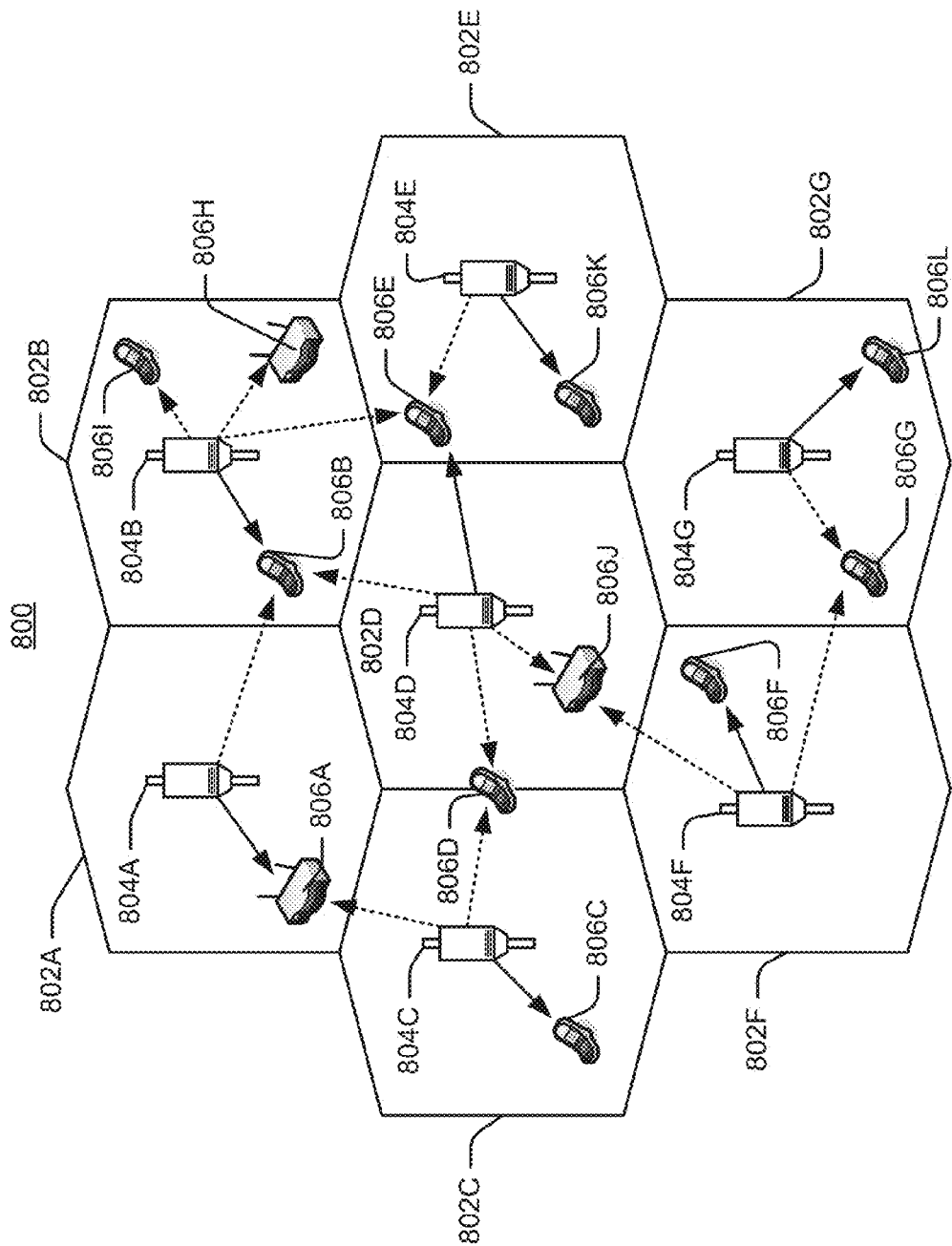
FIG. 8 is a simplified diagram of a wireless communication system.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G). As shown in FIG. 8, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in a rural environment.

Figure 9:
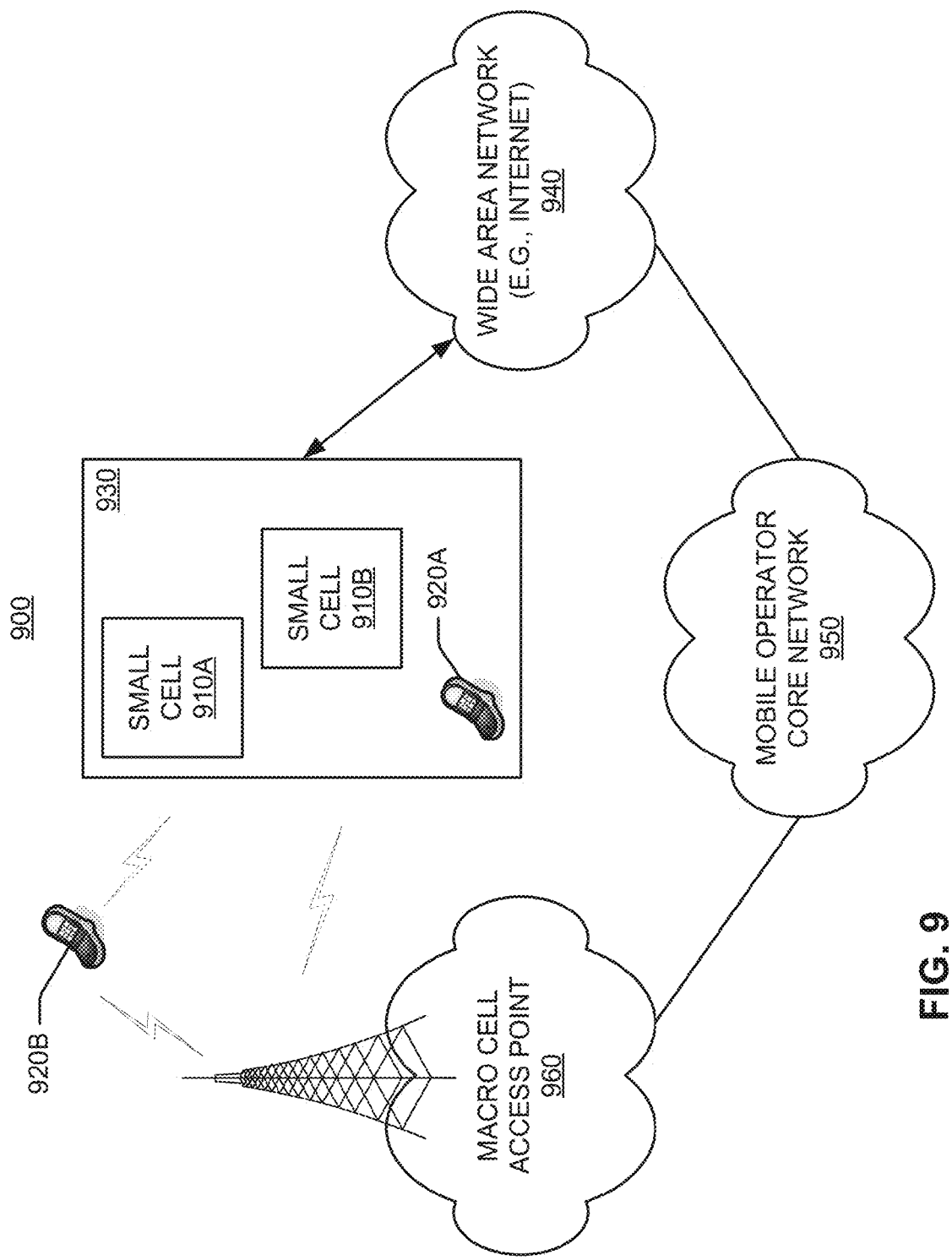
FIG. 9 is a simplified diagram of a wireless communication system including small cells.

FIG. 9 illustrates an example of a communication system 900 where one or more small cells are deployed within a network environment. Specifically, the system 900 includes multiple small cells 910 (e.g., small cells 910A and 910B) installed in a relatively small scale network environment (e.g., in one or more user residences 930). Each small cell 910 may be coupled to a wide area network 940 (e.g., the Internet) and a mobile operator core network 950 via a DSL router, a cable modem, a wireless link, or other connectivity means (not shown). As will be discussed below, each small cell 910 may be configured to serve associated access terminals 920 (e.g., access terminal 920A) and, optionally, other (e.g., hybrid or alien) access terminals 920 (e.g., access terminal 920B). In other words, access to small cells 910 may be restricted whereby a given access terminal 920 may be served by a set of designated (e.g., home) small cell(s) 910 but may not be served by any non-designated small cells 910 (e.g., a neighbor's small cell 910).

Figure 10:
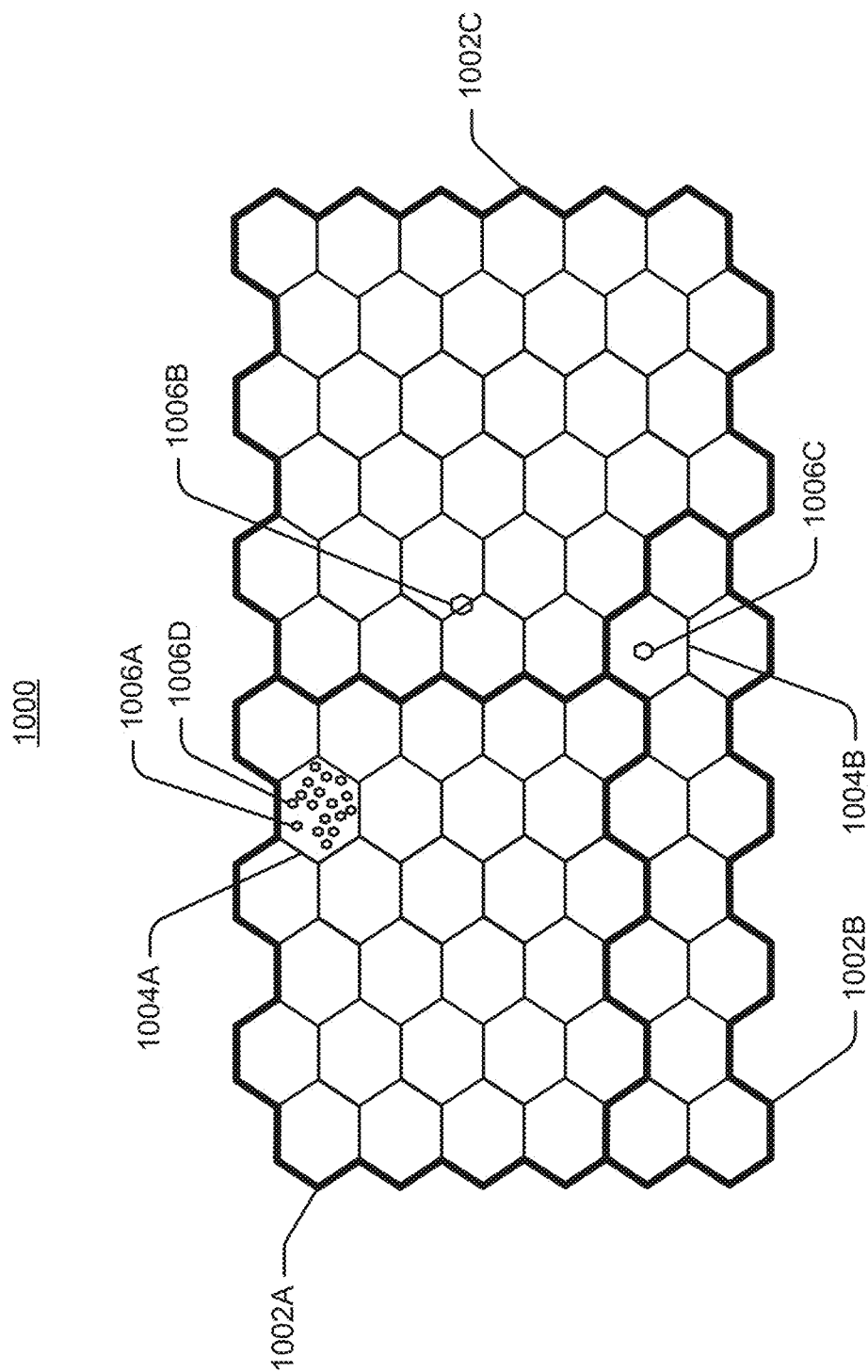
FIG. 10 is a simplified diagram illustrating coverage areas for wireless communication.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include small cell coverage areas 1006. In this example, each of the small cell coverage areas 1006 (e.g., small cell coverage areas 1006B and 1006C) is depicted within one or more macro coverage areas 1004 (e.g., macro coverage areas 1004A and 1004B). It should be appreciated, however, that some or all of a small cell coverage area 1006 might not lie within a macro coverage area 1004. In practice, a large number of small cell coverage areas 1006 (e.g., small cell coverage areas 1006A and 1006D) may be defined within a given tracking area 1002 or macro coverage area 1004.

Referring again to FIG. 9, the owner of a small cell 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of small cells 910 (e.g., the small cells 910A and 910B that reside within a corresponding user residence 930). For example, when a subscriber is outside his home, he is served by a standard macro access point (e.g., access point 960) and when the subscriber is at home, he is served by a small cell (e.g., small cell 910A). Here, a small cell 910 may be backward compatible with legacy access terminals 920.

A small cell 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred small cell (e.g., the home small cell of the access terminal 920) whenever such connectivity is possible. For example, whenever the access terminal 920A is within the user's residence 930, it may be desired that the access terminal 920A communicate only with the home small cell 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred small cell 910) using a better system reselection (BSR) procedure, which may involve a periodic scanning of available systems to determine whether better systems are currently available and subsequently acquire such preferred systems. The access terminal 920 may limit the search for specific band and channel. For example, one or more small cell channels may be defined whereby all small cells (or all restricted small cells) in a region operate on the small cell channel(s). The search for the most preferred system may be repeated periodically. Upon discovery of a preferred small cell 910, the access terminal 920 selects the small cell 910 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 910 that reside within the corresponding user residence 930). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., 911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. For example, a small cell access point may be restricted, a home small cell access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
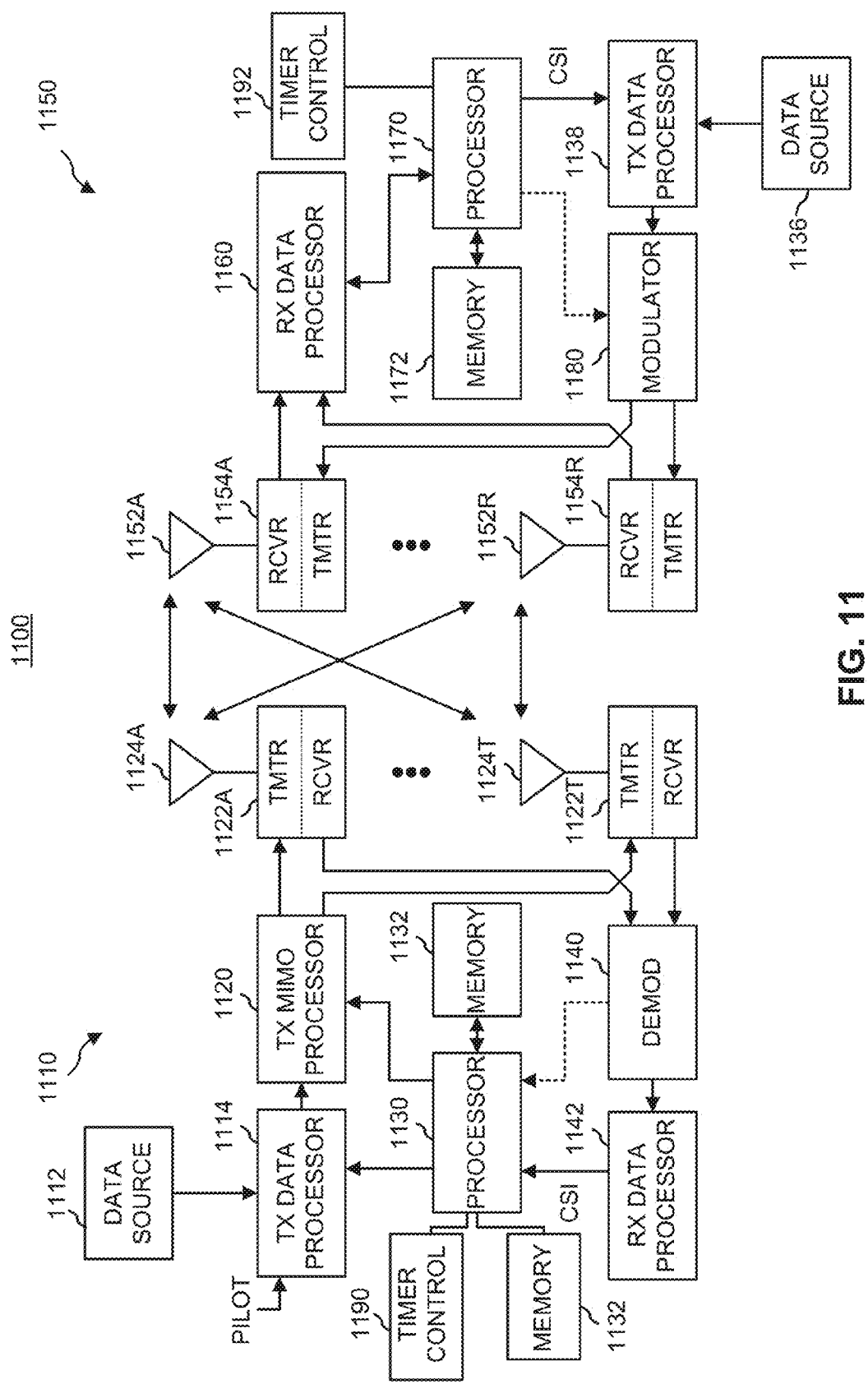
FIG. 11 is a simplified block diagram of several sample aspects of communication components.

FIG. 11 illustrates a wireless device 1110 (e.g., an access point) and a wireless device 1150 (e.g., an access terminal) of a sample MIMO system 1100. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which precoding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform timer control operations as taught herein. For example, a timer control component 1190 may cooperate with the processor 1130 and/or other components of the device 1110 to control a timer used in conjunction with communication with another device (e.g., device 1150) as taught herein. Similarly, a timer control component 1192 may cooperate with the processor 1170 and/or other components of the device 1150 to control a timer used in conjunction with communication with another device (e.g., device 1110). It should be appreciated that for each device 1110 and 1150 the functionality of two or more of the described components may be provided by a single component. For example, a single processing component may provide the functionality of the timer control component 1190 and the processor 1130 and a single processing component may provide the functionality of the timer control component 1192 and the processor 1170.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects, a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects, the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims.

Figure 12:
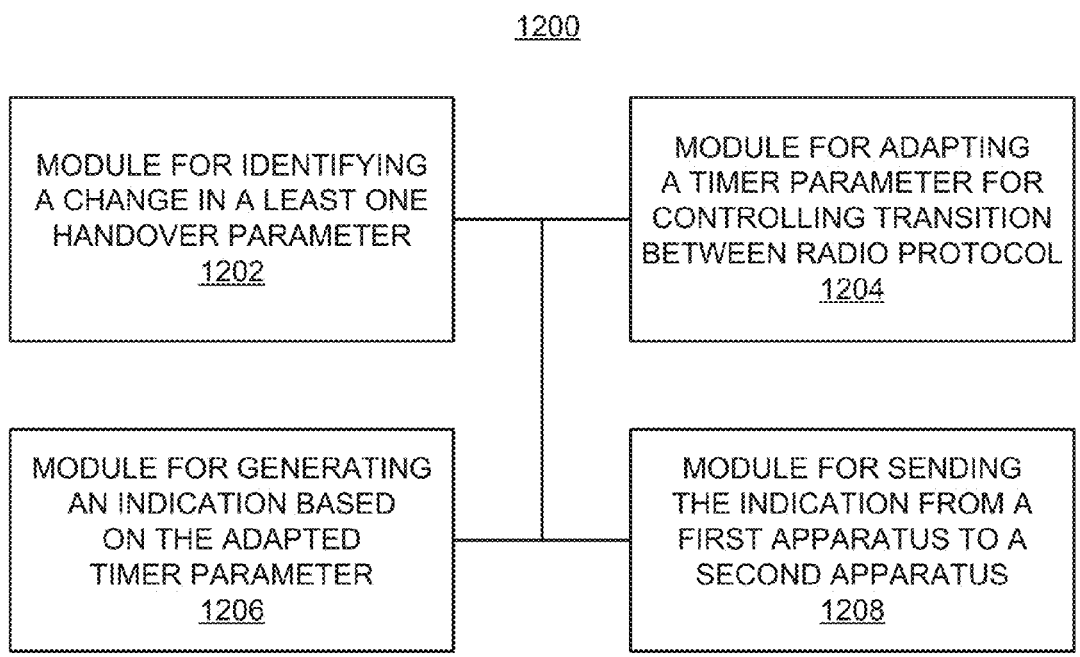
FIG. 12 is a simplified block diagram of several sample aspects of an apparatus configured to support timer adaptation as taught herein.

Referring to FIG. 12, an apparatus 1200 is represented as a series of interrelated functional modules. A module for identifying a change in at least one handover parameter 1202 may correspond at least in some aspects to, for example, a processing system as discussed herein. A module for adapting a timer parameter for controlling transition between radio protocol states 1204 may correspond at least in some aspects to, for example, a processing system as discussed herein. A module for generating an indication based on the adapted timer parameter 1206 may correspond at least in some aspects to, for example, a processing system as discussed herein. A module for sending the indication from a first apparatus to a second apparatus 1208 may correspond at least in some aspects to, for example, a communication device (e.g., a transmitter) as discussed herein.

The functionality of the modules of FIG. 12 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. As one specific example, the apparatus 1200 may comprise a single device (e.g., components 1202-1208 comprising different sections of an ASIC). As another specific example, the apparatus 1200 may comprise several devices (e.g., the components 1202, 1204, and 1206 comprising one ASIC and the component 1208 comprising another ASIC). The functionality of these modules also may be implemented in some other manner as taught herein. In some aspects one or more of any dashed blocks in FIG. 12 are optional.

In addition, the components and functions represented by FIG. 12 as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein. Several examples follow.

In some implementations, processing system structure is configured to embody the functionality of the means for identifying. For example, this structure may be programmed or designed to receive a signal indicative of a change in a handover parameter. As another example, this structure may be programmed or designed to receive handover parameter criteria and determine, based on that criteria, whether and/or how to change a handover parameter. In addition, this structure may be programmed or designed to generate (e.g., output) an indication of the identified change.

In some implementations, processing system structure is configured to embody the functionality of the means for adapting. For example, this structure may be programmed or designed to receive an indication indicative of an identified change in a handover parameter. To this end, this structure may be coupled to receive the indication from the structure for the means for identifying. In addition, this structure may be programmed or designed to adapt a timer parameter (e.g., based on the received indication). Also, this structure may be programmed or designed to generate (e.g., output) an indication of the adapted timer parameter.

In some implementations, processing system structure is configured to embody the functionality of means for generating. For example, this structure may be programmed or designed to receive an adapted timer parameter from the structure for the means for adapting. In addition, this structure may be programmed or designed to generate an indication based on the adapted timer parameter. Also, this structure may be programmed or designed to generate (e.g., output) an indication of the generated indication.

In some implementations, communication device structure is configured to embody the functionality of the means for sending. For example, this structure may be programmed or designed to receive the indication generated by the means for generating. In addition, this structure may be programmed or designed to send this indication to another apparatus. For example, the communication device structure may comprise a wire-based or wireless-based transmitter device.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm operations described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of operations in any disclosed process is an example of a sample approach. Based upon design preferences, it is understood that the specific order or hierarchy of operations in the processes may be rearranged while remaining within the scope of the present disclosure. The accompanying method claims present elements of the various operations in a sample order, and are not meant to be limited to the specific order or hierarchy presented.

The operations of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code(s) executable (e.g., executable by at least one computer) to provide functionality relating to one or more of the aspects of the disclosure. In some aspects, a computer program product may comprise packaging materials.

In one or more implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for communication, comprising:
a processing system configured to:
identify a change in at least one handover parameter defining a criterion for assessing a measurement associated with triggering handover,
adapt a timer parameter for controlling transition between radio protocol states, wherein the adapting of the timer parameter is based on the identified change in the at least one handover parameter, and
generate an indication based on the adapted timer parameter; and
a communication device configured to send the indication from the apparatus to a second apparatus.

2. The apparatus of claim 1, wherein the timer parameter comprises an inactivity timer value.

3. The apparatus of claim 1, wherein the timer parameter comprises a radio link failure timer value.

4. The apparatus of claim 1, wherein the at least one handover parameter comprises at least one of: a time-to-trigger parameter, an offset parameter, a hysteresis parameter, or a combination thereof.

5. The apparatus of claim 1, wherein the radio protocol states comprise a connected state and an idle state.

6. The apparatus of claim 1, wherein the radio protocol states comprise a connected state and a radio link failure state.

7. The apparatus of claim 1, wherein:
the processing system is configured to generate the indication by transitioning from a first one of the radio protocol states to a second one of the radio protocol states based on the adapted timer parameter and generating a message indicative of the transition; and
the communication device is configured to send the indication by transmitting the message to the second apparatus.

8. The apparatus of claim 1, wherein the indication comprises a value of the adapted timer parameter.

9. The apparatus of claim 1, wherein the processing system is configured to identify the change in the at least one handover parameter by determining that the change is to be made or determining that the change has been made.

10. The apparatus of claim 1, wherein the processing system is configured to identify the change in the at least one handover parameter by receiving a signal indicative of the change.

11. The apparatus of claim 1, wherein:
the apparatus comprises an access point;
the second apparatus comprises an access terminal;
the radio protocol states are associated with the access terminal; and
the communication device is configured to send the indication by transmitting the indication to the access terminal.

12. A method of communication, comprising:
identifying a change in at least one handover parameter defining a criterion for assessing a measurement associated with triggering handover;
adapting a timer parameter for controlling transition between radio protocol states, wherein the adapting of the timer parameter is based on the identified change in the at least one handover parameter;
generating an indication based on the adapted timer parameter; and
sending the indication from a first apparatus to a second apparatus.

13. The method of claim 12, wherein the timer parameter comprises an inactivity timer value.

14. The method of claim 12, wherein the timer parameter comprises a radio link failure timer value.

15. The method of claim 12, wherein the at least one handover parameter comprises at least one of: a time-totrigger parameter, an offset parameter, a hysteresis parameter, or a combination thereof.

16. The method of claim 12, wherein the radio protocol states comprise a connected state and an idle state.

17. The method of claim 12, wherein the radio protocol states comprise a connected state and a radio link failure state.

18. The method of claim 12, wherein:
the generating of the indication comprises transitioning from a first one of the radio protocol states to a second one of the radio protocol states based on the adapted timer parameter and generating a message indicative of the transition; and
the sending of the indication comprises transmitting the message to the second apparatus.

19. The method of claim 12, wherein the indication comprises a value of the adapted timer parameter.

20. The method of claim 12, wherein the identifying of the change in the at least one handover parameter comprises determining that the change is to be made or determining that the change has been made.

21. The method of claim 12, wherein the identifying of the change in the at least one handover parameter comprises receiving a signal indicative of the change.

22. The method of claim 12, wherein:
the first apparatus comprises an access point;
the second apparatus comprises an access terminal;
the radio protocol states are associated with the access terminal; and
the sending of the indication comprises transmitting the indication to the access terminal.

23. An apparatus for communication, comprising:
means for identifying a change in at least one handover parameter defining a criterion for assessing a measurement associated with triggering handover;
means for adapting a timer parameter for controlling transition between radio protocol states, wherein the adapting of the timer parameter is based on the identified change in the at least one handover parameter;
means for generating an indication based on the adapted timer parameter; and
means for sending the indication from the apparatus to a second apparatus.

24. The apparatus of claim 23, wherein the timer parameter comprises an inactivity timer value.

25. The apparatus of claim 23, wherein the timer parameter comprises a radio link failure timer value.

26. The apparatus of claim 23, wherein the at least one handover parameter comprises at least one of: a time-to-trigger parameter, an offset parameter, a hysteresis parameter, or a combination thereof.

27. The apparatus of claim 23, wherein:
the means for generating the indication comprises means for transitioning from a first one of the radio protocol states to a second one of the radio protocol states based on the adapted timer parameter and means for generating a message indicative of the transition; and
the means for sending of the indication comprises means for transmitting the message to the second apparatus.

28. The apparatus of claim 23, wherein the indication comprises a value of the adapted timer parameter.

29. A non-transitory computer-readable medium comprising code for causing a computer to:
identify a change in at least one handover parameter defining a criterion for assessing a measurement associated with triggering handover;
adapt a timer parameter for controlling transition between radio protocol states, wherein the adapting of the timer parameter is based on the identified change in the at least one handover parameter;
generate an indication based on the adapted timer parameter; and
send the indication from a first apparatus to a second apparatus.

30. The non-transitory computer-readable medium of claim 29, wherein:
the generating of the indication comprises transitioning from a first one of the radio protocol states to a second one of the radio protocol states based on the adapted timer parameter and generating a message indicative of the transition; and
the sending of the indication comprises transmitting the message from the first apparatus to the second apparatus.

* * * * *